US007970913B2

(12) United States Patent
Machulsky et al.

(10) Patent No.: US 7,970,913 B2
(45) Date of Patent: Jun. 28, 2011

(54) VIRTUALIZING SOCKETS TO ENABLE THE MIGRATION OF A SYSTEM ENVIRONMENT

(75) Inventors: Zorik Machulsky, Gesher HaZiv (IL); Julian Satran, Atlit (IL); Leah Shalev, Zichron-Yaakov (IL); Edi Shmueli, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 12/347,339

(22) Filed: Dec. 31, 2008

(65) Prior Publication Data
US 2010/0169494 A1 Jul. 1, 2010

(51) Int. Cl.
*G06F 15/16* (2006.01)
(52) U.S. Cl. ........ 709/227; 709/229; 709/201; 709/226; 725/32; 725/42; 725/51
(58) Field of Classification Search .......... 709/200–206, 709/219, 223–231, 233
See application file for complete search history.

(56) References Cited

U.S. PATENT DOCUMENTS

| 6,643,262 B1 * | 11/2003 | Larsson et al. | 370/236 |
|---|---|---|---|
| 2009/0100349 A1 * | 4/2009 | Hancock | 715/751 |
| 2010/0106798 A1 * | 4/2010 | Barreto et al. | 709/217 |
| 2010/0146046 A1 * | 6/2010 | Fusari | 709/203 |

FOREIGN PATENT DOCUMENTS

| WO | WO2006013446 | 2/2006 |
|---|---|---|
| WO | WO2006136908 | 12/2006 |

OTHER PUBLICATIONS

K. Onoue et al., "A Virtual Machine Migration System Based on a CPU Emulator," IEEE Second International Workshop on Virtualization Technology in Distributed Computing (VTDC 2006), Nov. 2006, 8 pages.
X. Fu et al., "Transparent Network Connectivity in Dynamic Cluster Environments," 4th Workshop on Communication, Architecture, and Applications for Network-Based Parallel Computing (CANPC '00), Jan. 2000, pp. 1-11, vol. 1797.
S. Osman et al., "The Design and Implementation of Zap: A System for Migrating Computing Environments," 5th Symposium on Operating Systems Design and Implementation (OSDI 2002), Dec. 2002, pp. 1-16.

* cited by examiner

*Primary Examiner* — Jude J Jean Gilles
(74) *Attorney, Agent, or Firm* — Suzanne Erez; Ryan, Mason & Lewis, LLP

(57) ABSTRACT

Techniques for maintaining connectivity between a remote application stored on a remote device and an application being executed in a system environment, wherein the system environment is migrated from a first device to a second device, are provided. A first connection between the remote application stored on the remote device and the application being executed in the system environment stored on the first device is established via a first communication over a first negotiation channel. The first negotiation channel connects a first socket layer interface linked to the application being executed in the system environment to a second socket layer interface linked to the remote application. The first connection between the remote application and the application being executed in the system environment is disconnected for migration of the system environment from the first device to the second device. Disconnecting the first connection is coordinated via the first negotiation channel. A second connection between the remote application stored on the remote device and an application being executed in the migrated system environment stored on the second device is established via a second communication over a second negotiation channel. The second negotiation channel connects a third socket layer interface linked to the application being executed in the migrated system environment to the second socket layer interface linked to the remote application.

20 Claims, 6 Drawing Sheets

VIRTUALIZING SOCKETS TO ENABLE THE MIGRATION OF A SYSTEM ENVIRONMENT

FIELD OF THE INVENTION

The present invention relates generally to system management and, more particularly, to techniques for migrating system environments.

BACKGROUND OF THE INVENTION

System migration is the process of moving, for example, applications or programs, from one physical host to another. Migration may be carried out for a number of reasons, which may include consolidating and/or balancing system workloads across multiple hosts. In a complex migration scenario, a system manager may want to carry out migration while one or more entities (e.g., guests) are connected to one or more running applications or programs (i.e., a live migration). Ideally, live migration is to be carried out with minimal interruption to service. For instance, a guest using a networked service prior to migration should be able to continue interacting with the networked service after migration, as if migration had never happened. Techniques to enable such "transparency" to a guest exist; however, these techniques are not compatible with all system arrangements. Specifically, currently available techniques cannot handle systems which establish network connectivity using transports that either do not, or have difficulty supporting live migration.

A majority of transports are either semi-migration friendly or not migration friendly. In a system that uses semi-migration friendly transports (e.g., Transmission Control Protocol/Internet Protocol (TCP/IP) over Ethernet), live migration cannot be completely transparent to a guest unless there is additional support in the form of, for example, a hypervisor running on the guest's remote terminal. The level of additional support may vary depending on both the transport used and the nature of the migration. For instance, some transports require a minimal level of support if the live migration is local, but some transports require substantial support when the migration is distant, e.g., over a wide-area network (WAN). In a system that uses transports that are not migration friendly (e.g., InfiniBand or Myrinet), transparent migration is not possible; therefore, live migration is simply avoided.

SUMMARY OF THE INVENTION

Principles of the present invention provide techniques that overcome the above-mentioned drawbacks associated with existing migration methods by providing techniques that address the above needs, as well as other needs. Particularly, principles of the invention provide techniques for migrating a system environment from one device to a second device.

For example, in one embodiment of the invention a computer-implemented method for maintaining connectivity between a remote application stored on a remote device and an application being executed in a system environment, wherein the system environment is migrated from a first device to a second device, is provided. The method comprises executing steps on a computer. A first connection between the remote application stored on the remote device and the application being executed in the system environment stored on the first device is established via a first communication over a first negotiation channel. The first negotiation channel connects a first socket layer interface linked to the application being executed in the system environment to a second socket layer interface linked to the remote application. The first connection between the remote application and the application being executed in the system environment is disconnected for migration of the system environment from the first device to the second device. Disconnecting the first connection is coordinated via the first negotiation channel. A second connection between the remote application stored on the remote device and an application being executed in the migrated system environment stored on the second device is established via a second communication over a second negotiation channel. The second negotiation channel connects a third socket layer interface linked to the application being executed in the migrated system environment to the second socket layer interface linked to the remote application.

In another embodiment, a system for maintaining connectivity between a remote application stored on a remote device and an application being executed in a system environment, wherein the system environment is migrated from a first device to a second device, is presented. The system comprising: a first device comprising an application being executed in a system environment; a first socket layer interface coupled to the application being executed in the system environment, the first socket layer interface being configured to control one or more first virtual sockets; a remote device comprising a remote application; a second socket layer interface coupled to the remote application, the second socket layer interface being configured to control one or more second virtual sockets; a second device comprising an application being executed in a migrated system environment; and a third socket layer interface coupled to the application being executed in the migrated system environment, the third socket layer interface being configured to control one or more third virtual sockets. The first socket layer interface and the second socket layer interface are configured to communicate over a first negotiation channel to coordinate an enabling and disabling of the one or more first virtual sockets and the one or more second virtual sockets to establish and disconnect a first connection between the remote application and the application being executed in the system environment. The third socket layer interface and the second socket layer interface are configured to communicate over a second negotiation channel to coordinate an enabling of the one or more third virtual sockets and the one or more second virtual sockets to establish a second connection between the remote application and the application being executed in the migrated system environment.

In additional embodiments, the above technique for maintaining connectivity between a remote application stored on a remote device and an application being executed in a system environment, wherein the system environment is migrated from a first device to a second device, may be carried out by an apparatus and/or a computer program product.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
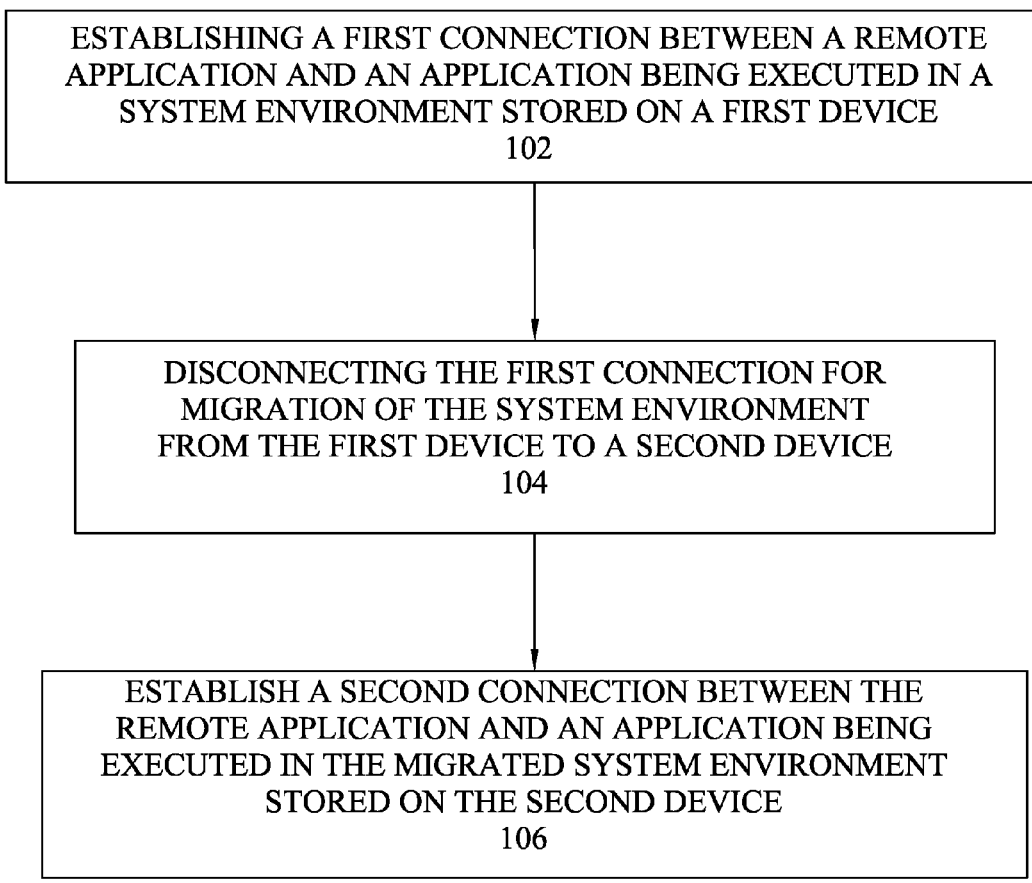
FIG. 1 is a flow diagram illustrating an exemplary methodology for maintaining connectivity between a remote application stored on a remote device and an application being executed in a system environment, wherein the system environment is migrated from a first device to a second device, according to an embodiment of the present invention.

Illustrative embodiment of the present invention will be described in conjunction with exemplary methods for maintaining connectivity between a remote application stored on a remote device and an application being executed in a system environment, wherein the system environment is migrated from a first device to a second device. Specifically, the present disclosure will illustrate live migration of a virtual environment in a system that uses one or more transports that are not conducive to live migration. It should be understood, however, that the invention is not limited to the particular embodiments described herein and modifications to the illustrative embodiments will become apparent to those skilled in the art given the teachings described herein.

The term "application" as used herein is intended to be construed broadly so as to encompass, by way of example and without limitation, any program or group of programs designed for one or more users.

The term "remote application" as used herein is intended to be construed broadly so as to encompass, by way of example and without limitation, any application running on a device not directly connected to a host device. In one illustrative embodiment, a user accesses an application on a host device using a remote application on a remote terminal; the remote application on the remote terminal is connected to the application on the host device via a network connection.

The term "system environment" as used herein is intended to be construed broadly so as to encompass, by way of example and without limitation, any area in which one or more programs and/or applications operate. In an illustrative embodiment, a system environment may be an operating system (OS) or a virtual machine running separately from an OS, on which an application runs.

The term "migration" as used herein is intended to be construed broadly so as to encompass, by way of example and without limitation, any process of moving one or more datum from one device to another. In an illustrative embodiment, a virtual system environment is migrated (e.g., moved) from a first device to a second device.

The term "transport" as used herein is intended to be construed broadly so as to encompass, by way of example and without limitation, any architecture used for the transmission of one or more datum between two or more devices. In an illustrative embodiment, a transport may be Ethernet, Infiniband, Myrinet, a Local Area Network (LAN), or a System Area Network (SAN). However, techniques of the present invention are not limited to these particular transports.

The term "protocol" as used herein is intended to be construed broadly so as to encompass, by way of example and without limitation, any agreed-upon format to be used to transmit one or more datum between two or more devices. In an illustrative embodiment, a protocol may be TCP/IP or Sockets Direct Protocol (SDP). However, techniques of the present invention are not limited to these particular protocols.

The term "socket" as used herein is intended to be construed broadly so as to encompass, by way of example and without limitation, any object that connects an application to a transport.

The term "transport service" as used herein is intended to be construed broadly so as to encompass, by way of example and without limitation, any connection between two or more devices utilizing a specific protocol over a specific transport. In an illustrative embodiment, a transport service may be TCP/IP over Ethernet or TCP/IP over InfiniBand. However, techniques of the present invention are not limited to these particular transport services.

Systems using transports that are semi-migration friendly require additional support in the form of, for example, a hypervisor in order to make live migration transparent. TCP/IP over Ethernet may be an example of a semi-migration friendly transport. When using this transport arrangement, migration may be carried out within the boundaries of a local subnet and it may be sufficient for a hypervisor on a migrated host to generate an unsolicited Address Resolution Protocol (ARP) reply, advertising that an application previously running on a former host has moved to a new location (e.g., location of the migrated host). This reconfigures peers on the local subnet to send future packets directed to the application to the new location, where the hypervisor on the migrated host intercepts these packets and forwards them to the application.

Migration may also be possible for TCP/IP over Wide Area Networks (WAN), but this requires an additional level of cooperation between a source hypervisor on a pre-migrated host and a destination hypervisor on a migrated host. In this schema, a source subnet continues to act as the home subnet for an application and the source hypervisor acts as a proxy for the application. After migration, data packets directed to the application are intercepted by the source hypervisor and the source hypervisor forwards the packets to the destination hypervisor on the migrated host. In turn, the destination hypervisor strips off tunnel headers and forwards the original packets to the application at the migrated host.

While the above examples demonstrate that transparent migration may be feasible over TCP/IP over dumb Ethernet Network Interface Cards (NIC), other transports exist which are not migration friendly. For these transports, it is not possible to carry out migration transparently regardless of any support that may be provided by a hypervisor. The common approach in these cases is to avoid live migration altogether or to avoid using the non-friendly transport in order to enable live migration.

Transports that are not migration friendly may include intelligent NICs utilizing transports such as InfiniBand, Myrinet, or TCP/IP offload adapters. These transports provide hardware level reliable services and direct Input/Output (I/O) access, which result in excellent performance and flexibility in clustered system environments. However, compared with traditional network devices such as dumb Ethernet adapters, intelligent NICs pose unresolved challenges with respect to migration in clustered environments. For instance, these transports utilize Host Channel Adapters (HCA), which manage large amounts of location dependent resources that are kept transparent to both applications and OSs, and cannot be migrated with an OS instance. The HCAs manage data structures for resources such as Queue Pairs or memory regions. Applications may use opaque handles to access the HCA resources; however, after migration from one physical machine to another physical machine different HCAs are used and the opaque handles are no longer valid. In addition, HCAs manage connection state, which cannot be migrated without non-standard hardware support.

InfiniBand is another example of a transport that is not migration friendly. InfiniBand port addresses (local ID or LID) are associated with ports and only one LID may be associated with each port. The mapping between the LIDs and physical ports are managed by external subnet management tools making it difficult to change during migration. Also, since the LIDs may be used by environments (e.g., multiple virtual machines) sharing the same HCA, it may not be feasible to change LIDs during migration.

In an illustrative embodiment of the present invention, a technique to enable the migration of a system environment, such as a virtual machine, over transports not conducive to live migration is presented. In one exemplary embodiment, the technique utilizes virtualized sockets. The virtualized sockets may connect an application to a transport allowing the application to communicate with one or more other applications via the transport. A thin software layer on top of the sockets and linked to the application may be used to couple and decouple the application from the transport. As will be explained in greater detail below, this allows transparency at the application level.

Referring initially to FIG. 1, a flow diagram illustrates an exemplary methodology for maintaining connectivity between a remote application stored on a remote device and an application being executed in a system environment, wherein the system environment is migrated from a first device to a second device, according to an embodiment of the present invention. In one illustrative embodiment, methodology 100 may be implemented by a thin socket virtualization layer (SVL) (e.g., a socket layer interface) linked to a remote application. The remote application may be stored on a remote device (e.g., a personal computer, a server, etc.) and may be used by one or more users to access an application on a host device.

In an exemplary embodiment, the SVL may be a user-space library which provides to applications a standard stream-mode sockets interface. The SVL may use several types of underlying transport services, such as TCP/IP or SDP over InfiniBand, and may detect which transports are currently available to an application. For most socket operations, a SVL may merely invoke corresponding operations at an underlying transport. However, a SVL may also establish and disconnect a connection between a remote application and a host application in a manner that is transparent to both applications.

At step 102, the SVL of a remote application (SVL-remote) may establish a connection (e.g., a first connection) between the remote application stored on a remote device to an application being executed in a system environment stored on a host device (e.g., a first device). In an illustrative embodiment, the transport services available to the remote device may differ from the transport services available to the host device, and therefore, the one or more transport services to be used for connecting the remote application to the application on the host device may be resolved.

In an exemplary embodiment, SVL-remote may be connected to a SVL linked to the application on the host device (SVL-host) via a first negotiation channel. The negotiation channel may be an out-of-band channel that may be used to negotiate and select the one or more transport services to be used to connect the remote application to the application on the host device. In an illustrative embodiment, the negotiation channel may be established over an agreed-upon TCP port.

The negotiation between SVL-remote and SVL-host may be implemented as a kernel service. During negotiation, a transport service may be selected based on the available services supported by the remote device and the host device. For example, if both devices can access the same InfiniBand fabric, both SVLs may use SDP over InfiniBand, which allows implementation of stream-mode sockets using Remote Direct Memory Access (RDMA). It should be appreciated that a TCP/IP transport may be used by default when either the remote device and/or the host device has no SVL, or when there is no other common transport service.

In an exemplary embodiment, negotiation may be carried out via one or more communications over the pre-established negotiation channel described above. In one illustrative embodiment, SVL-remote may receive, via the negotiation channel, a list of transport services supported by the host device from SVL-host. The list of transport services may be prioritized, for example, the SVL-host may specify preferred transport services which may be in accordance with performance (i.e., efficiency, speed, etc.). SVL-remote may compare the list of transport services supported by/available to the host device to the transport services supported by/available to the remote device. SVL-remote may then select one or more transport services from the received list of transport services that are supported by both devices. It should be noted that SVL-remote may select one or more transport services with the best performance or SVL-remote may be configured to select one or more transport services at random if multiple transport services have comparable performance.

After making one or more selections, SVL-remote may notify SVL-host of the one or more selections via the negotiation channel. At this point, SVL-host may enable one or more virtual sockets, which connect the application being executed on the host device to the one or more selected transport services. Concurrently, SVL-remote may enable one or more virtual sockets for the remote application, connecting the remote application to the one or more selected transport services. After both applications are connected to one or more mutual transport services, the established connection(s) may be used by the applications to communicate with each other. Specifically, a SVL of a corresponding application may delegate all socket calls to an appropriate transport, with some additional operations performed for data transmit and receive operations.

In an alternative embodiment, a connection between the remote application and the application on the host device may be established passively. In the case of passive connection establishment, a SVL may listen for incoming connection establishment requests on all available transports. After a connection establishment request arrives on one of the transports, the SVL may accept the request and enable one or more virtual sockets to connect to that transport.

Using the example above, a connection may be established between a remote application and an application being executed in a virtual machine on a host device. In an illustrative embodiment, before a migration of the virtual machine from the host device to a second device (e.g., target device), the connection between the applications may be severed. At step 104, the connection between the remote application and the application of the host device may be disconnected. Disconnection of the connection between the two applications may be coordinated via the first negotiation channel, which links SVL-remote to SVL-host as previously described above.

In an exemplary embodiment, a decision may be made by a system manager to migrate a system environment from the host device to a target device. In one embodiment, an OS of the host device may be notified by a hypervisor of an instruction to migrate. The OS may then notify SVL-host. SVL-host may send a notification to SVL-remote via the first negotiation channel of the instruction to migrate. After SVL-remote receives the notification to migrate, the connection between the remote application and the application on the host device may be drained (e.g., cleared). It should be noted that the connection between the remote application and the application of the host device may be cut as a result of the migration process; therefore, draining may be carried out to prevent the loss of any data traveling through the connection prior to migration. The draining process may be a coordinated effort between SVL-remote and SVL-host. For example, both SVLs may suspend the exchange of data and track in-flight data to ensure that all exchanged data is accounted for.

In an illustrative embodiment, SVL-host may suspend any transmissions to the remote application. If the application on the host device attempts to perform a transmit operation, the transmission may be blocked by SVL-host or the application may be notified that the transmit buffer is full; this may depend on a mode of the socket. After SVL-host suspends transmissions, a request to drain the connection may be sent to SVL-remote via the negotiation channel. In addition, SVL-host may notify SVL-remote of the total amount of data which may have been transmitted on the connection. Upon receiving the above request, SVL-remote may also suspend transmit operations on its side of the connection. Further, SVL-remote may notify SVL-host of the total amount of transmitted data in which SVL-host may expect to receive. Each SVL may then compare the amount of data received on the connection with the total amount of data transmitted by the other side. If there is still data in-flight, the data may be read into buffers; one or more buffers may be coupled to each SVL. The buffers may be used to create the appearance that connectivity is maintained through migration. For example, if a given application tries to perform a receive operation during the migration or after the migration, the buffered data may be retrieved from the SVL buffers. This may give an application the perception that a connection is still active even though, in actuality, the connection is cut.

SVL-remote may notify SVL-host when all in-flight data is received on the remote end and SVL-host may notify SVL-remote when all in-flight data is received on the host end. In one embodiment, SVL-remote may then instruct SVL-host, or vice versa, to disable their respective sockets from their respective transports. This closes the connection between the remote application and the application on the host device.

In an exemplary embodiment, the virtual machine on the host device may then migrate to the target device. After migration, a second connection between the remote application and the application being executed on the migrated virtual machine on the target device may be established (step 106). The process of establishing the second connection between the remote application and the application running on the migrated system may be similar to step 102 described above. In an illustrative embodiment, SVL-remote may be connected to a SVL linked to the application running on the migrated system (SVL-target) via a second negotiation channel. As in step 102, a negotiation may be carried out via one or more communications over the second pre-established negotiation channel.

In one illustrative embodiment, SVL-remote may receive, via the second negotiation channel, a list of transport services supported by the target device. The list of transport services may be sent from SVL-target. Further, the list of transport services may be prioritized as described above with reference to step 102. SVL-remote may compare the list of transport services to the transport services supported by the remote device. SVL-remote may then select one or more transport services that are supported by both devices. As previously noted, SVL-remote may select one or more transport services with the best performance or SVL-remote may be configured to select one or more transport services at random if multiple transport services have comparable performance.

After making one or more selections, SVL-remote may notify SVL-target of the one or more selections via the second negotiation channel. At this point, SVL-target may enable one or more virtual sockets to connect the application being executed on the target device to the one or more selected transport services. Concurrently, SVL-remote may enable one or more virtual sockets to connect the remote application to the one or more selected transport services. After both applications are connected to one or more mutual transport services, the established connection(s) may be used by the applications to communicate with each other. Specifically, a SVL of a corresponding application may delegate all socket calls to the appropriate transport, with some additional operations performed for data transmit and receive operations.

It should be noted that normal communications between the remote application and the application of the migrated system may not occur immediately after establishing a new connection. In an illustrative embodiment, any data stored within a buffer of a SVL may be accessed by a given application before the application accepts any data from the new connection. This may preserve the order of data exchanged between the remote application and the application operating on the migrated system. In an exemplary embodiment, any data transmitted over the new connection may be directed to a corresponding buffer of a corresponding SVL until the buffer is emptied (e.g., an application processes all the buffered data and is brought back to a speed of normal operation). After the buffer is emptied, a normal exchange of data may be carried out over the new connection.

Figure 2:
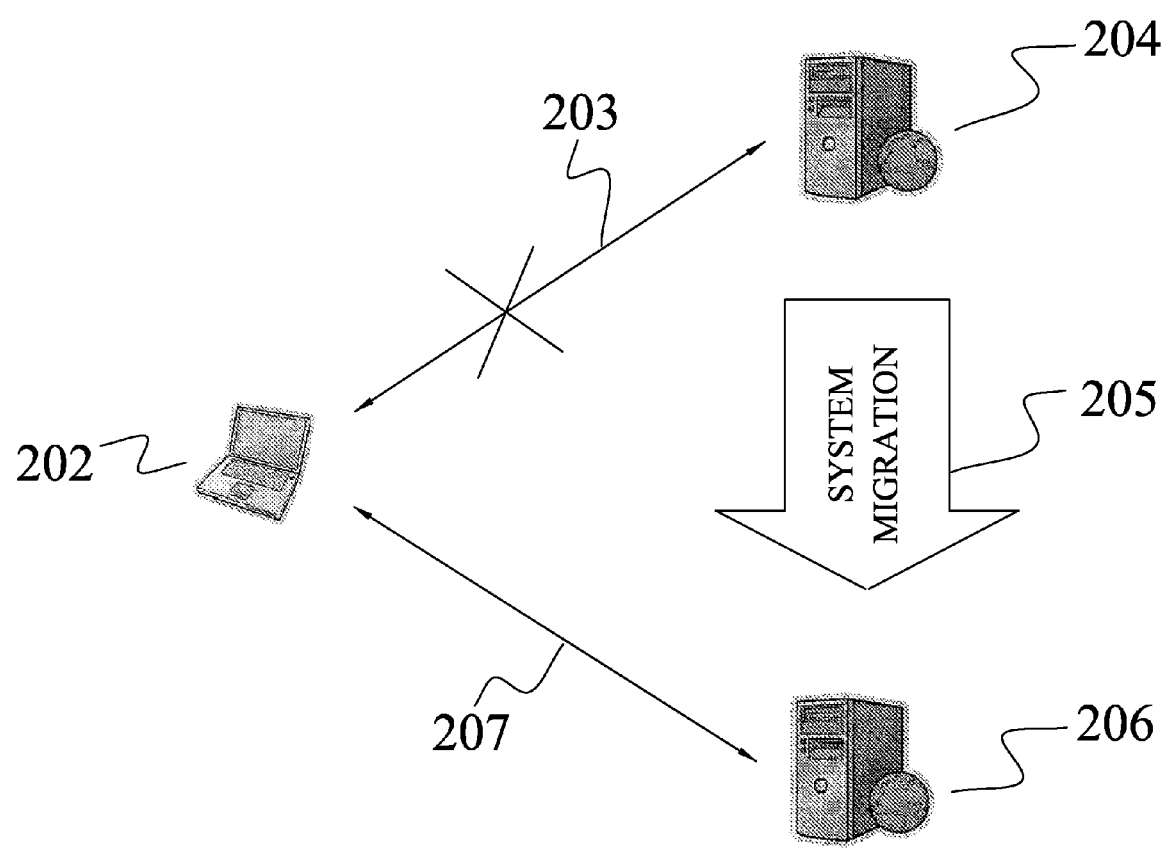
FIG. 2 is a diagram illustrating an exemplary system for carrying out the methodology of FIG. 1, according to an embodiment of the present invention.

Referring now to FIG. 2, a diagram illustrates an exemplary system for carrying out the methodology of FIG. 1, according to an embodiment of the present invention. FIG. 2 depicts the interaction between a remote device 202, a first device 204, and a second device 206. A user at remote device 202 may use a remote application (not shown) to access an application (not shown) being executed on a system (not shown) on the first device 204. The remote application may be connected to the application on the first device 204 via a first connection 203 over a given transport service. It should be noted that the first connection 203 may be established as described above with reference to FIG. 1, step 102.

In an illustrative embodiment, the system on the first device 204 is to be migrated 205 to the second device 206. As described above with reference to FIG. 1, step 104, the first connection 203 may be severed prior to migration (marked as "X" through first connection 203). The system may then migrate 205 to the second device 206. After migration, a second connection 207 may be established between the remote device 202 and an application being executed in the migrated system (not shown) on the second device 206. The second connection 207 may be established as described above with reference to FIG. 1, step 106.

Figure 3:
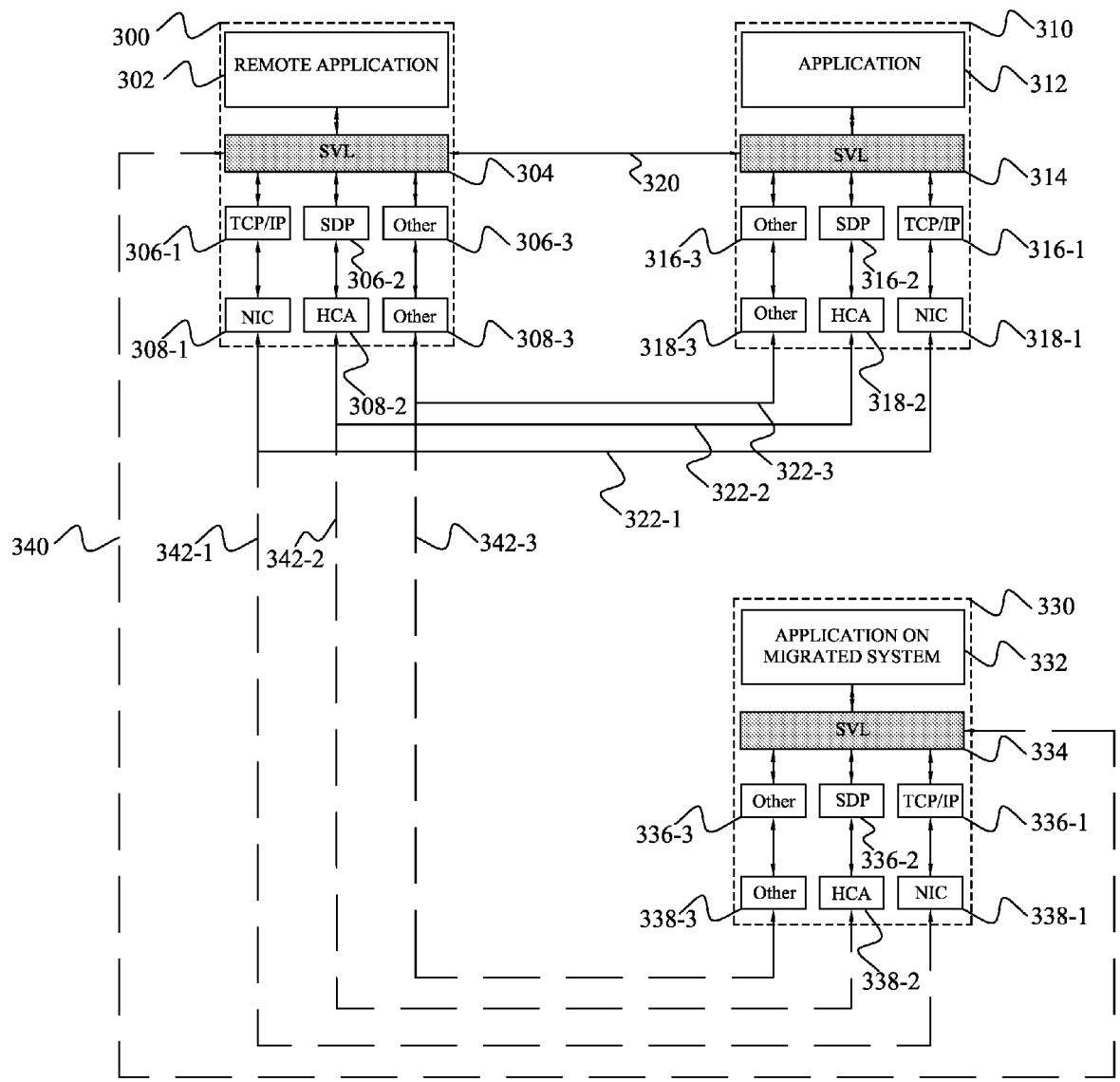
FIG. 3 is a system diagram illustrating an exemplary migration of a system and maintaining connectivity with a remote device, according to an embodiment of the present invention.

Referring now to FIG. 3, a system diagram illustrates an exemplary migration of a system and maintaining connectivity with a remote device, according to an embodiment of the present invention. In an exemplary embodiment, a remote application 302 may be executed within a remote system 300 (e.g., a virtual machine, virtual OS, etc.) stored on a remote device. The remote device may be remote device 202 of FIG. 2. The remote application 302 may be linked to a socket layer interface, SVL-remote 304. SVL-remote 304 may be configured to enable and/or disable one or more virtual sockets to establish and/or disconnect a connection for the remote application 302 of a particular protocol (306-1, 306-2, 306-3) (e.g., TCP/IP, SDP, other) over hardware of a specific transport (308-1, 308-2, 308-3) (e.g., NIC, HCA, other).

In an illustrative embodiment, remote application 302 may be used by a user to interact with application 312 running within a host system 310 (e.g., a virtual machine, virtual OS, etc.) stored on a first device. The first device may be first device 204 of FIG. 2. Application 312 may be linked to another socket layer interface, SVL-host 314. SVL-host 314 may be configured to enable and/or disable one or more virtual sockets to establish and/or disconnect a connection for the application 312 of a particular protocol (316-1, 316-2, 316-3) (e.g., TCP/IP, SDP, other) over hardware of a specific transport (318-1, 318-2, 318-3) (e.g., NIC, HCA, other).

As described above with reference to FIG. 1, step 102, a first connection (322-1, 322-2, 322-3) may be established between the remote application 302 and the application 312 via one or more communications over a first negotiation channel 320. The first negotiation channel 320 may connect SVL-remote 304 to SVL-host 314 and may facilitate negotiations regarding the selection of a preferred transport service to be used for data exchange. The first negotiation channel 320 may also be used to coordinate a disconnection of the first connection (322-1, 322-2, 322-3) prior to migration of the host system 310. The process of disconnecting is described above with reference to FIG. 1, step 104.

In an exemplary embodiment, host system 310 may be migrated to a second device. The second device may be second device 206 of FIG. 2. The migrated system 330 stored on the second device may comprise an application 332 that operates in place of application 312. The application on the migrated system 332 may be linked to another socket layer interface, SVL-target 334. SVL-target 334 may be configured to enable and/or disable one or more virtual sockets to establish and/or disconnect a connection for application 332 of a particular protocol (336-1, 336-2, 336-3) (e.g., TCP/IP, SDP, other) over hardware of a specific transport (338-1, 338-2, 338-3) (e.g., NIC, HCA, other).

As described above with reference to FIG. 1, step 106, a second connection (342-1, 342-2, 342-3) may be established between the remote application 302 and the application on the migrated system 332 via one or more communications over a second negotiation channel 340. The second negotiation channel 340 may connect SVL-remote 304 to SVL-target 334 and may facilitate negotiations regarding the selection of a preferred transport service to be used for data exchange. The second negotiation channel 340 may also be used to coordinate a disconnection of the second connection (342-1, 342-2, 342-3) prior to any subsequent migration of the migrated system 330. The process of a subsequent disconnection may be similar to the disconnection described above with reference to FIG. 1, step 104.

Figure 4:
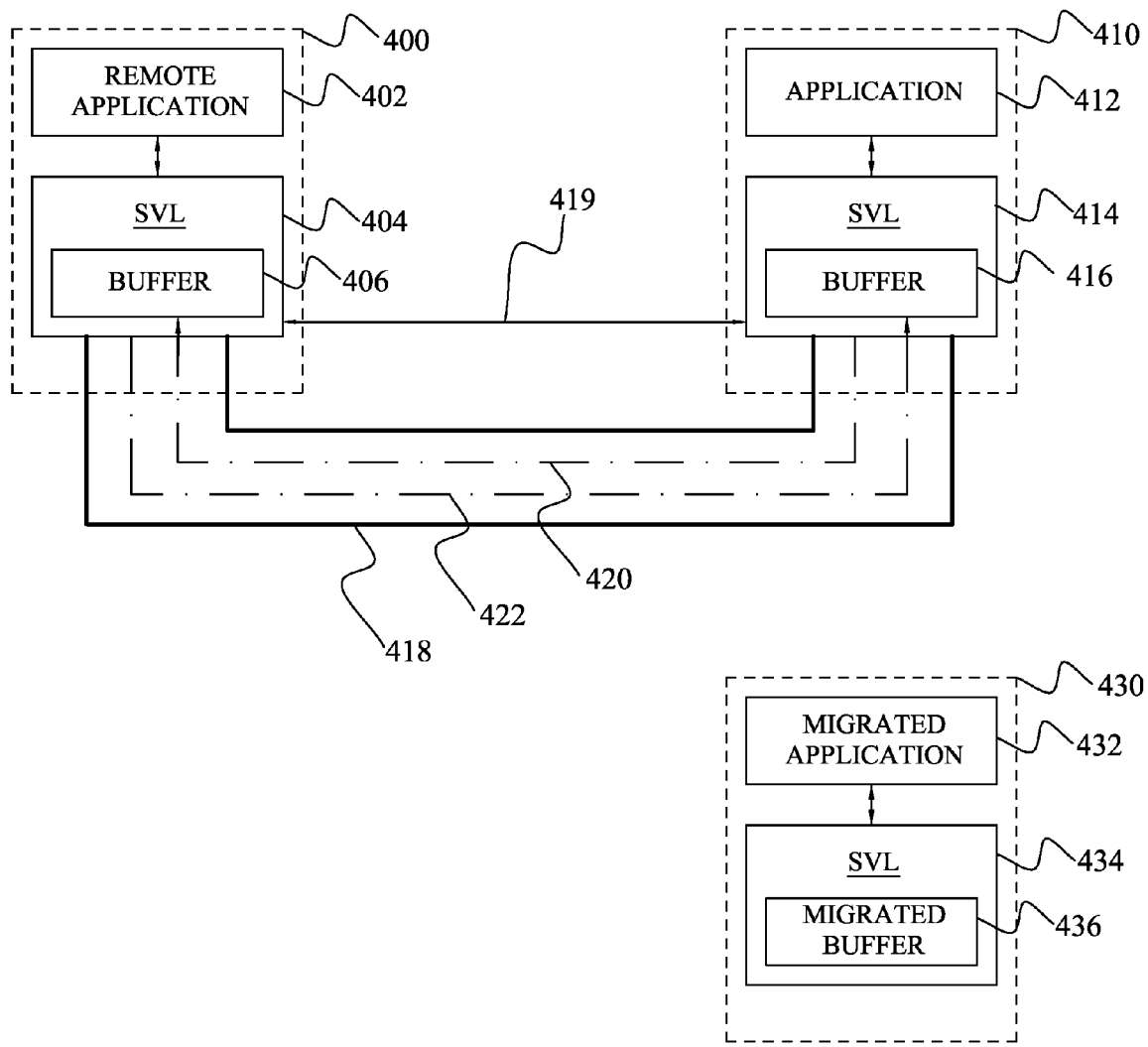
FIG. 4 is a diagram illustrating an exemplary buffering of data exchanged between a remote application and an application before migration, according to an embodiment of the present invention.

Referring now to FIG. 4, a diagram illustrates an exemplary buffering of data exchanged between a remote application and an application before migration, according to an embodiment of the present invention. As described above with reference to step 104 of FIG. 1, a connection between a remote application and an application may be drained prior to migration. In FIG. 4, a remote application 402 being executed on a remote system 400 stored on a remote device (not shown) may be connected, via a first connection 418, to an application 412 being executed on a host system 410 stored on a host device. In an illustrative embodiment, SVL-host 414 may notify SVL-remote 404, via a first negotiation channel 419, of a migration of host system 410; host system 410 may migrate to a second device, i.e., migrated system 430 comprising migrated application 432 linked to SVL-target 434 comprising migrated buffer 436. Prior to migration, SVL-host 414 and SVL-remote 404 may coordinate a draining of the first connection 418.

In an exemplary embodiment, both SVL-remote 404 and SVL-host 414 may suspend transmit operations over the first connection 418. As described above with reference to step 104 of FIG. 1, SVL-remote 404 and SVL-host 414 may track the transmissions traveling through the first connection 418. Further, any in-flight transmissions may be stored in one or more buffers (e.g., 406 and 416). In an illustrative embodiment, any outgoing transmissions 420 from application 412, which are directed to remote application 402, may be redirected to buffer 406 of SVL-remote 404. Further, any outgoing transmissions 422 from remote application 402, which are directed to application 412, may be redirected to buffer 416 of SVL-host 414. After the first connection 418 is emptied, the first connection may be severed and migration of the host system 410 may take place.

Figure 5:
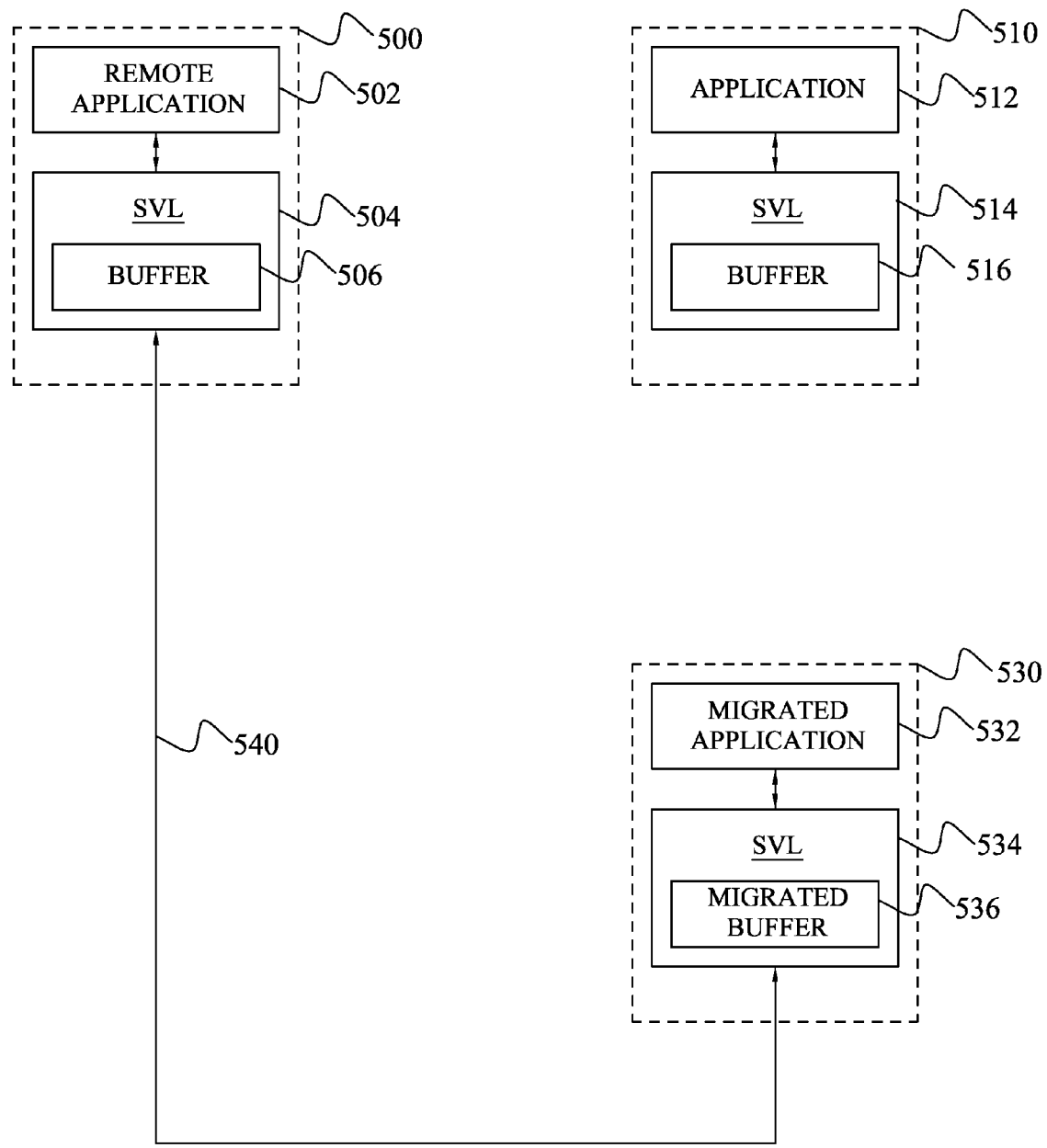
FIG. 5 is a diagram illustrating an exemplary exchange of data between a remote application and an application after migration, according to an embodiment of the present invention.

Referring now to FIG. 5, a diagram illustrates an exemplary exchange of data between a remote application and an application after migration, according to an embodiment of the present invention. In an illustrative embodiment, host system 510 comprising application 512 linked to SVL-host 514 comprising buffer 516 may be migrated to a second device, i.e., migrated system 530 comprising migrated application 532 linked to SVL-target 534 comprising migrated buffer 536. Further, a second connection 540 may be established between remote application 502 being executed on remote system 500 and migrated application 532. The second connection 540 may be established as described above with reference to step 106 of FIG. 1.

As described above with reference to step 106 of FIG. 1, after establishing a new connection and before any transmissions of data over the new connection are used, any data stored in buffer 506 of SVL-remote 504 and any data stored in buffer 536 may be accessed first. For example, data stored in buffer 506 prior to migration may be used to satisfy any receive operations performed by remote application 502 during or after migration. It should be noted that the data stored in buffer 506 may be data transmitted by application 512 that was directed to remote application 502 prior to migration. In addition to the above, data stored in migrated buffer 536 may be used to satisfy any receive operations performed by migrated application 532. It should be noted that the data stored in migrated buffer 536 may be data transmitted by remote application 502 that was directed to application 512 prior to migration. It should also be appreciated that since application 512 may have been replaced by migrated application 532, any data transmissions from remote application 502 made prior to the migration may be directed to migrated application 532 after migration.

It should be appreciated that the illustrative buffer system described herein may make a migration transparent to any applications affected by the migration. The buffers may provide uninterrupted operation of an application even though connectivity is temporarily interrupted as a result of migration. After the data in the buffers (e.g., 506 and 536) are exhausted, operations between remote application 502 and migrated application 532 may be carried out directly via the second connection 540.

Figure 6:
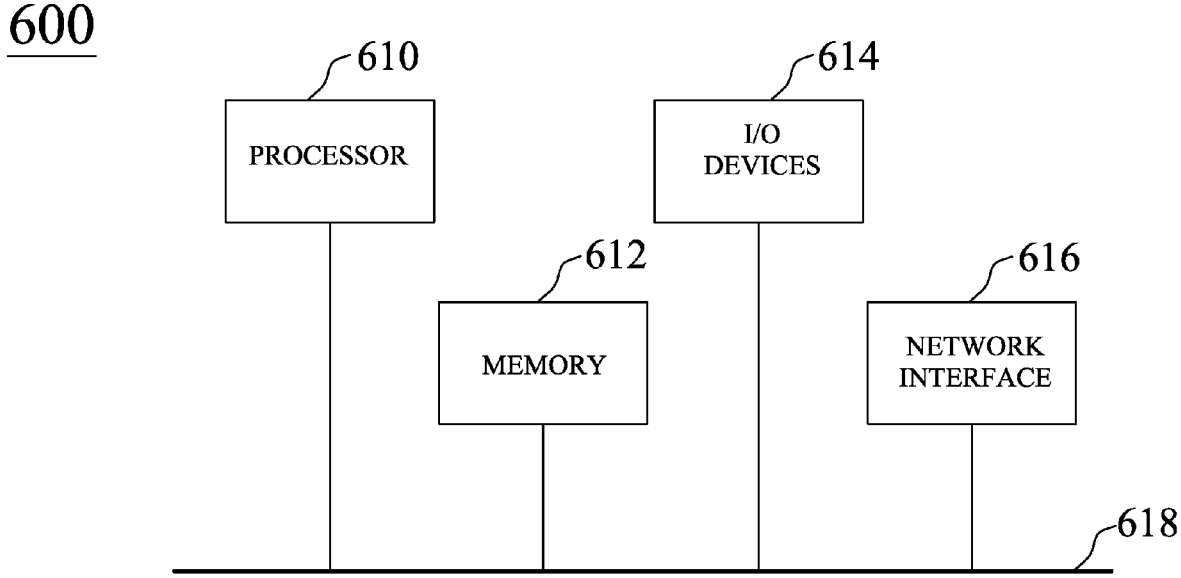
FIG. 6 is a diagram illustrating an illustrative hardware implementation of a computing system in accordance with which one or more components/methodologies of the present invention may be implemented, according to an embodiment of the present invention.

Referring now to FIG. 6, block diagram 600 illustrates an exemplary hardware implementation of a computing system in accordance with which one or more components/methodologies of the invention (e.g., components/methodologies described in the context of FIGS. 1-5) may be implemented, according to an embodiment of the present invention.

As shown, the techniques for maintaining connectivity between a remote application stored on a remote device and an application being executed in a system environment, wherein the system environment is migrated from a first device to a second device, may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer-readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

As will be appreciated by one skilled in the art, the principles of the present invention may be embodied as a system, method, or computer program product. Accordingly, the principles of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the principles of the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electro-magnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a LAN or a WAN, or the connection may be made to an external computer (for example, through the Internet using an Internet Service Provider).

Further, the present invention was described above with reference to diagrams of methods, apparatus (systems), and computer program products according to embodiments of the invention. It will be understood that individual functions/acts in the diagrams, and combinations of functions/acts in the diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the diagrams.

These computer program instructions may also be stored in a computer-readable medium that may direct a computer or other programmable data processing apparatus to function in a particular manner, such that the instructions stored in the computer-readable medium produce an article of manufacture including instruction means which implement the functions/acts specified in the diagrams.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the diagrams.

The diagrams illustrate the architecture, functionality, and operation of possible implementations of systems, methods, and computer program products according to various embodiments of the present invention. In this regard, individual functions/acts in the diagrams may represent a module, segment, or portion of code, which comprises one or more executable instructions for implementing the specified logical function(s). It should also be noted that, in some alternative implementations, the functions/acts in the diagrams may occur out of the order noted in the diagrams. For example, two steps shown in succession may, in fact, be executed substantially concurrently, or the steps may sometimes be executed in the reverse order, depending upon the functionality involved. It will also be noted that individual functions/acts in the diagrams, and combinations of functions/acts in the diagrams, may be implemented by special purpose hardware-based systems that perform the specified functions or acts, or combinations of special purpose hardware and computer instructions.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for maintaining connectivity between a remote application stored on a remote device and an application being executed in a system environment, wherein the system environment is migrated from a first device to a second device, the method comprising executing the following steps on a computer:
   establishing a first connection between the remote application stored on the remote device and the application being executed in the system environment stored on the first device via a first communication over a first negotiation channel, wherein the first negotiation channel connects a first socket layer interface linked to the application being executed in the system environment to a second socket layer interface linked to the remote application;
   disconnecting the first connection between the remote application and the application being executed in the system environment for migration of the system environment from the first device to the second device, wherein disconnecting the first connection is coordinated via the first negotiation channel; and
   establishing a second connection between the remote application stored on the remote device and an application being executed in the migrated system environment stored on the second device via a second communication over a second negotiation channel, wherein the second negotiation channel connects a third socket layer interface linked to the application being executed in the migrated system environment to the second socket layer interface linked to the remote application.

2. The method of claim 1, wherein the step of establishing the first connection further comprises:
   receiving from the first socket layer interface a list of transport services supported by the first device;
   selecting a transport service from the received list of transport services, the selected transport service being supported by the remote device;
   notifying the first socket layer interface of the selected transport service, wherein the first socket layer interface enables one or more first virtual sockets to establish a connection over the selected transport service for the application being executed in the system environment stored on the first device; and
   establishing a connection over the selected transport service for the remote application stored on the remote device using one or more second virtual sockets, wherein the one or more second virtual sockets are enabled by the second socket layer interface.

3. The method of claim 2, wherein the list of transport services comprises one or more transport services supporting at least one of a Transmission Control Protocol/Internet Protocol and a Sockets Direct Protocol over at least one of Ethernet, InfiniBand, Myrinet, a Local Area Network, and a System Area Network.

4. The method of claim 1, wherein the step of disconnecting further comprises the steps of:
   receiving a notification from the first socket layer interface of the migration of the system environment from the first device to the second device;
   clearing the first connection of one or more datum transmitted between the application being executed in the system environment stored on the first device and the remote application;
   instructing the first socket layer interface to disable one or more first virtual sockets connecting the application being executed in the system environment stored on the first device to the first connection when the first connection is clear; and
   disabling one or more second virtual sockets connecting the remote application to the first connection, the one or more second virtual sockets being disabled by the second socket layer interface.

5. The method of claim 4, wherein the step of clearing the first connection of the one or more datum transmitted between the application being executed in the system environment stored on the first device and the remote application further comprises:
   tracking the one or more datum transmitted between the application being executed in the system environment stored on the first device and the remote application; and
   storing the one or more datum traveling through the first connection in a buffer, wherein the one or more stored datum are rerouted to the application being executed in the migrated system environment stored on the second device after migration.

6. The method of claim 1, wherein the step of establishing the second connection further comprises:
   receiving from the third socket layer interface a list of transport services supported by the third device;
   selecting a transport service from the received list of transport services, the selected transport service being supported by the remote device;
   notifying the third socket layer interface of the selected transport service, wherein the third socket layer interface enables one or more third virtual sockets to establish a connection over the selected transport service for the application being executed in the migrated system environment stored on the second device; and
   establishing a connection over the selected transport service for the remote application stored on the remote device using one or more second virtual sockets, wherein the one or more second virtual sockets are enabled by the second socket layer interface.

7. The method of claim 6, wherein the list of transport services comprises one or more transport services supporting at least one of a Transmission Control Protocol/Internet Protocol and a Sockets Direct Protocol over at least one of Ethernet, InfiniBand, Myrinet, a Local Area Network, and a System Area Network.

8. The method of claim 1, further comprising the steps of:
   storing one or more datum transmitted over the first connection in a buffer prior to disconnecting the first connection; and
   obtaining from the buffer the one or more stored datum after establishing the second connection.

9. An apparatus for maintaining connectivity between a remote application stored on a remote device and an application being executed in a system environment, wherein the system environment is migrated from a first device to a second device, the apparatus comprising:
   a memory; and
   at least one processor coupled to the memory and operative to: establish a first connection between the remote application stored on the remote device and the application being executed in the system environment stored on the first device via a first communication over a first negotiation channel, wherein the first negotiation channel connects a first socket layer interface linked to the application being executed in the system environment to a second socket layer interface linked to the remote application; disconnect the first connection between the remote application and the application being executed in the system environment for migration of the system environment from the first device to the second device, wherein disconnecting the first connection is coordinated via the first negotiation channel; and establish a second connection between the remote application stored on the remote device and an application being executed in the migrated system environment stored on the second device via a second communication over a second negotiation channel, wherein the second negotiation channel connects a third socket layer interface linked to the application being executed in the migrated system environment to the second socket layer interface linked to the remote application.

10. The apparatus of claim 9, wherein the operation of establishing the first connection, the at least one processor is further operative to:
receive from the first socket layer interface a list of transport services supported by the first device;
select a transport service from the received list of transport services, the selected transport service being supported by the remote device;
notify the first socket layer interface of the selected transport service, wherein the first socket layer interface enables one or more first virtual sockets to establish a connection over the selected transport service for the application being executed in the system environment stored on the first device; and
establish a connection over the selected transport service for the remote application stored on the remote device using one or more second virtual sockets, wherein the one or more second virtual sockets are enabled by the second socket layer interface.

11. The apparatus of claim 10, wherein the list of transport services comprises one or more transport services supporting at least one of a Transmission Control Protocol/Internet Protocol and a Sockets Direct Protocol over at least one of Ethernet, InfiniBand, Myrinet, a Local Area Network, and a System Area Network.

12. The apparatus of claim 9, wherein the operation of disconnecting, the at least one processor is further operative to:
receive a notification from the first socket layer interface of the migration of the system environment from the first device to the second device;
clear the first connection of one or more datum transmitted between the application being executed in the system environment stored on the first device and the remote application;
instruct the first socket layer interface to disable one or more first virtual sockets connecting the application being executed in the system environment stored on the first device to the first connection when the first connection is clear; and
disable one or more second virtual sockets connecting the remote application to the first connection, the one or more second virtual sockets being disabled by the second socket layer interface.

13. The apparatus of claim 12, wherein the operation of clearing the first connection of the one or more datum transmitted between the application being executed in the system environment stored on the first device and the remote application, the at least one processor is further operative to:
track the one or more datum transmitted between the application being executed in the system environment stored on the first device and the remote application; and
store the one or more datum traveling through the first connection in a buffer, wherein the one or more stored datum are rerouted to the application being executed in the migrated system environment stored on the second device after migration.

14. The apparatus of claim 9, wherein the operation of establishing the second connection, the at least one processor is further operative to:
receive from the third socket layer interface a list of transport services supported by the third device;
select a transport service from the received list of transport services, the selected transport service being supported by the remote device;
notify the third socket layer interface of the selected transport service, wherein the third socket layer interface enables one or more third virtual sockets to establish a connection over the selected transport service for the application being executed in the migrated system environment stored on the second device; and
establish a connection over the selected transport service for the remote application stored on the remote device using one or more second virtual sockets, wherein the one or more second virtual sockets are enabled by the second socket layer interface.

15. The apparatus of claim 14, wherein the list of transport services comprises one or more transport services supporting at least one of a Transmission Control Protocol/Internet Protocol and a Sockets Direct Protocol over at least one of Ethernet, InfiniBand, Myrinet, a Local Area Network, and a System Area Network.

16. The apparatus of claim 9, the at least one processor being further operative to:
storing one or more datum transmitted over the first connection in a buffer prior to disconnecting the first connection; and
obtaining from the buffer the one or more stored datum after establishing the second connection.

17. A system for maintaining connectivity between a remote application stored on a remote device and an application being executed in a system environment, wherein the system environment is migrated from a first device to a second device, the system comprising:
a first device comprising an application being executed in a system environment;
a first socket layer interface coupled to the application being executed in the system environment, the first socket layer interface being configured to control one or more first virtual sockets;
a remote device comprising a remote application;
a second socket layer interface coupled to the remote application, the second socket layer interface being configured to control one or more second virtual sockets;
a second device comprising an application being executed in a migrated system environment; and
a third socket layer interface coupled to the application being executed in the migrated system environment, the third socket layer interface being configured to control one or more third virtual sockets;

wherein the first socket layer interface and the second socket layer interface are configured to communicate over a first negotiation channel to coordinate an enabling and disabling of the one or more first virtual sockets and the one or more second virtual sockets to establish and disconnect a first connection between the remote application and the application being executed in the system environment, further wherein the third socket layer interface and the second socket layer interface are configured to communicate over a second negotiation channel to coordinate an enabling of the one or more third virtual sockets and the one or more second virtual sockets to establish a second connection between the remote application and the application being executed in the migrated system environment.

18. The system of claim 17, further comprising a buffer configured to store one or more datum transmitted over the first connection prior to migration.

19. The system of claim 18, wherein the buffer is configured to release the one or more stored datum to at least one of the remote application and the application being executed on the migrated system environment after migration.

20. A computer program product for maintaining connectivity between a remote application stored on a remote device and an application being executed in a system environment, wherein the system environment is migrated from a first device to a second device, the computer program product comprising:

a computer readable storage medium;

a first program instruction to establish a first connection between the remote application stored on the remote device and the application being executed in the system environment stored on the first device via a first communication over a first negotiation channel, wherein the first negotiation channel connects a first socket layer interface linked to the application being executed in the system environment to a second socket layer interface linked to the remote application;

a second program instruction to disconnect the first connection between the remote application and the application being executed in the system environment for migration of the system environment from the first device to the second device, wherein disconnecting the first connection is coordinated via the first negotiation channel; and a third program instruction to establish a second connection between the remote application stored on the remote device and an application being executed in the migrated system environment stored on the second device via a second communication over a second negotiation channel, wherein the second negotiation channel connects a third socket layer interface linked to the application being executed in the migrated system environment to the second socket layer interface linked to the remote application, wherein the first, second, and third program instructions are stored on the computer readable storage medium.

* * * * *